United States Patent [11] 3,560,636

[72] Inventor Carl A. Barlow, Jr.
Dallas, Tex.

[21] Appl. No. 628,962
[22] Filed Apr. 6, 1967
[45] Patented Feb. 2, 1971
[73] Assignee Texas Instruments Incorporated
Dallas, Tex.
a corporation of Delaware

[54] COLOR DISPLAY SYSTEM
3 Claims, 5 Drawing Figs.

[52] U.S. Cl. .......... 178/5.4, 313/92
[51] Int. Cl. .......... H04n 9/22; H01j 29/18
[50] Field of Search .......... 178/5.4RW; 313/92

[56] References Cited
UNITED STATES PATENTS

| | | | |
|---|---|---|---|
| 2,827,593 | 3/1958 | Koller .......... | 315/21 |
| 3,271,512 | 9/1966 | Daw .......... | 178/5.2 |
| 3,315,029 | 4/1967 | Suhrmann .......... | 178/5.4 |

OTHER REFERENCES

Huges, " Some Color Slide and Color Television Experiments Using the Land Technique," I.R.E. Transactions on Broadcasting, Volume BC6, March 1960, pp. 29— 33

*Primary Examiner*—Richard Murray
*Assistant Examiner*—John C. Martin
*Attorneys*—Samuel M. Mims, Jr., James O. Dixon, Andrew M. Hassell, Harold Levine, Gerald B. Epstein and Koenig, Senniger, Powers and Leavitt

ABSTRACT: Color display systems are described for producing polychromatic color images from two different color records corresponding to two substantially different respective hues, one color record effecting the production of an image portion in relatively long wavelength or red light, while the other image portion is produced in white light having a color temperature between about 2800° to 3600° K. Phosphor materials which produce white light of this desired spectral composition and quality are disclosed as having a relative luminosity ratio of $I_R:I_G:I_B \simeq 0.4/0.56/0.04$.

COLOR DISPLAY SYSTEM

This invention relates to color display systems and more particularly to such systems which produce polychromatic color images from two different records corresponding to two substantially different respective hues.

Such systems as have been proposed previously, such as for use in color television reception utilizing for example the red and green color signals as the two different records, sequentially produce alternate image portions in light of relatively long wavelengths (e.g., red) and a white or achromatic light. The composite of these image portions produces a perceived sensation of color significantly more varied in hues and saturation than that which would result based on standard colorimetric procedures. In producing the white image portions, such display systems typically use phosphors which emit light rich in short wavelength or blue colors and emit little light of longer wavelengths. However, although such systems produce reds and blues, they provide little or no perception of middle hues such as greens, yellows and browns. Also, the flesh tones produced in these prior art binary systems arrear generally grayish and are less than wholly pleasing. It has been found in accordance with this invention that binary color display systems that do not possess these disadvantages can be provided by utilizing for alternate image portions white light of a particular quality, character and spectral composition.

Among the several objects of this invention may be noted the provision of color display systems of the binary-type in which the perceived colors have improved rendition in the middle ranges of greens, yellow and browns and the flesh tones are enhanced. Other objects and features will be in part apparent and in part pointed out hereinafter.

Briefly the invention is directed to a color display system for producing polychromatic color images from two different records corresponding to two substantially different respective hues. The system includes a viewing screen, and means for producing on this screen two image portions each corresponding to one of the image portions. One of these records is produced in light of relatively long wavelengths and the other of the image portions is produced in achromatic light having a color temperature between about 2800° and 3600° K. The resulting composite of these image portions produces a perceived sensation of color significantly more varied in hues and saturation than that which would result based on standard colorimetric procedures and the flesh tones in the composite of said image portions are enhanced.

The invention accordingly comprises the constructions hereinafter described, the scope of the invention being indicated in the following claims.

In the accompanying drawings, in which one of various possible embodiments of the invention is illustrated, FIG. 1 is a graphical representation of a chromaticity diagram illustrating the actual colors present in a color display system of this invention as contrasted with a prior art system;

Corresponding reference characters indicate corresponding parts throughout the several views of the drawings.

Referring now more particularly to the drawings, a conventional chromaticity or CIE diagram is shown with the three primary colors red, blue and green represented at R, B and G as indicated at the three apices, and the "rainbow" or 100 percent saturation curve indicated at S. A thinner solid-line curve BB illustrates the black body curve, i.e., the color of light emitted when an ideal black body cools from a maximum high temperature (as indicated at the extreme right end of curve BB) to a saturated red heat or color (as indicated at the extreme left end of curve BB) which represents a saturated red color. Dashed-line curve PA illustrates a typical prior art binary color display system using for reproduction of one image portion a relatively long wavelength color such as a fairly saturated red as indicated at point X, and for reproduction of the alternate image portion a white or substantially achromatic light as indicated at point C. The locus of the colors actually produced in this system is therefore represented by line PA, the quality or character of the white light C being described as a cold white, which is quite bluish and has a color temperature in the order of at least about 8000° K. Thus this white light includes an abundance of light of short wavelengths to which the human eye is particularly sensitive.

Figure 2:
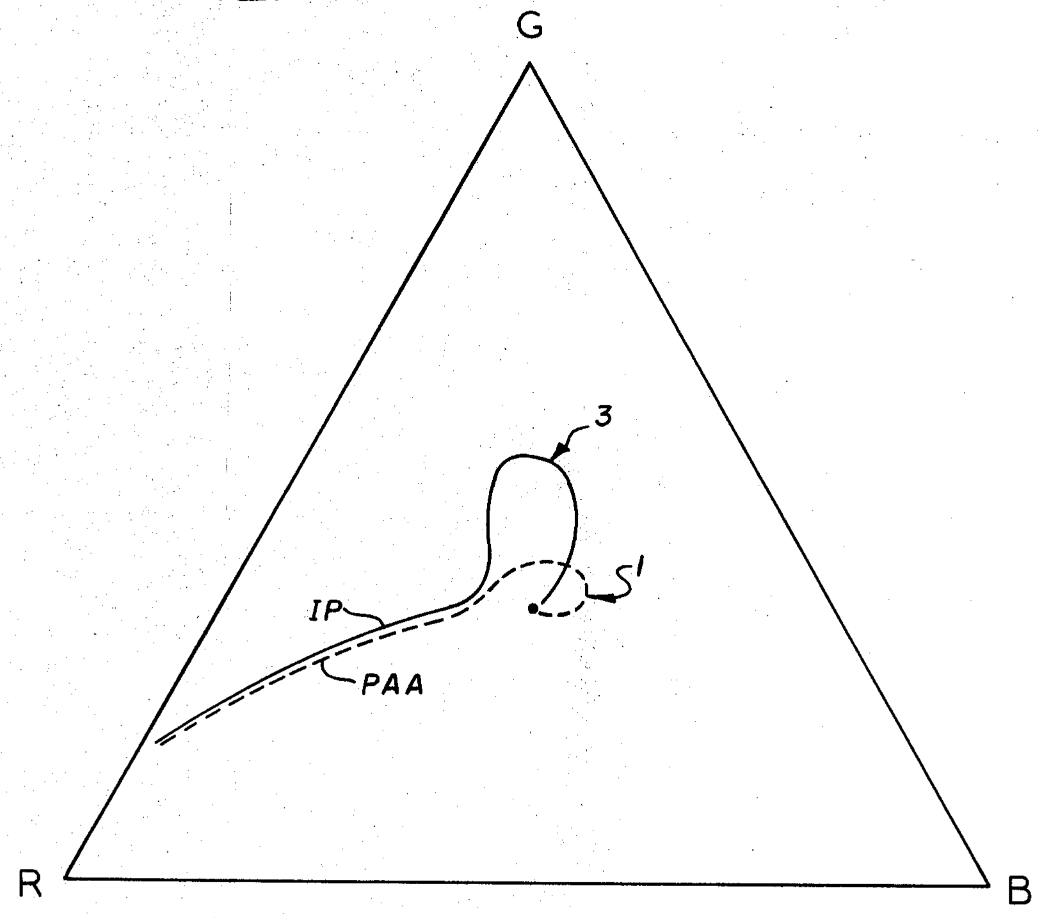
FIG. 2 is a graphical representation of a similar diagram illustrating the colors typically perceived in a color display system of this invention compared to those perceived in a prior art system.

The range of colors perceived or apparently sensed by the human eye viewing such a typical prior art color display system is illustrated by curve PAA of FIG. 2. The loop area of this curve, indicated by reference numeral 1, illustrates that some blues and some greens, but at very low saturation, are perceived by the eye when viewing such a prior art color display system. In contrast to the limited saturation values and the low degree of middle hues perceived in viewing this prior art binary system, curve IP represents the colors perceived by the present invention. As is shown by the loop portion of the latter curve indicated at 3, the colors of middle hues, such as yellows, greens and browns, are perceived to a much greater extent and to markedly greater saturation levels than in the known binary systems described above. This also provides flesh tones in the composite of these image portions, which flesh tones are much more pleasing than those of prior art binary systems which tend to be grayish.

Figure 1:
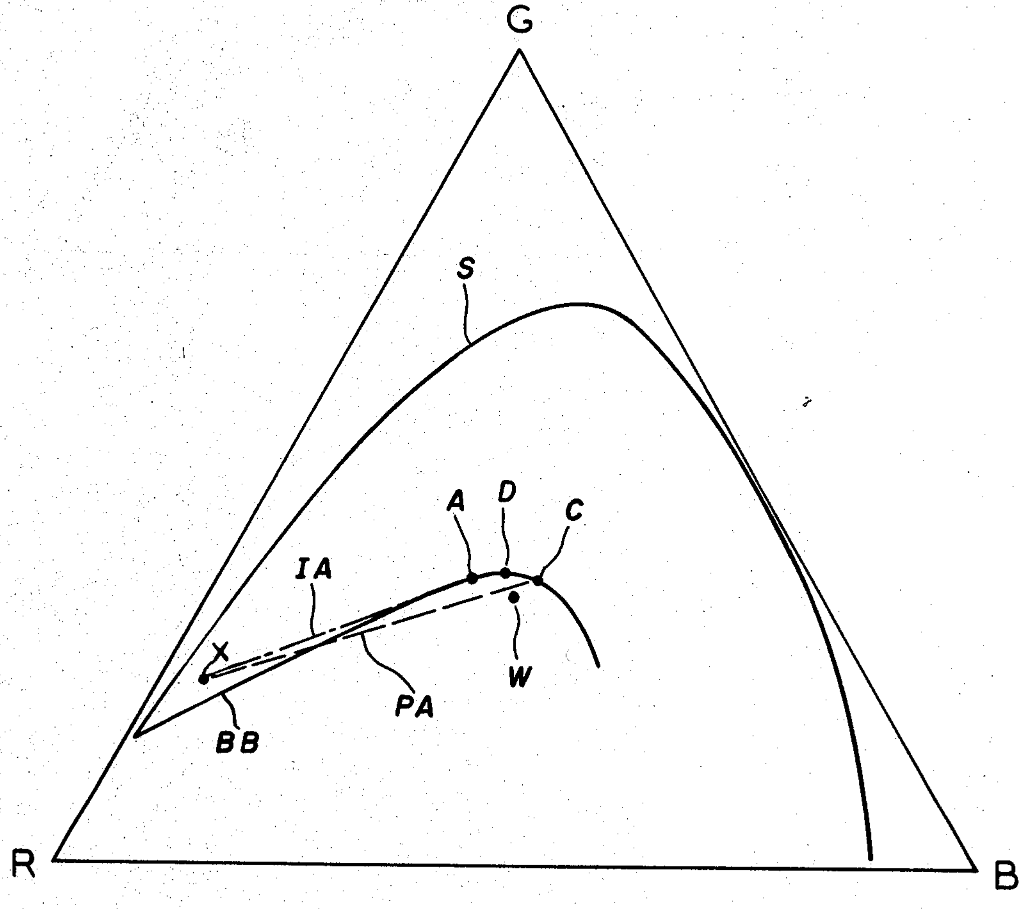

In accordance with this invention, such advantageous results as illustrated by perceived color curve IP are obtained by providing an essentially white or achromatic light of a particular spectral composition. Light of this quality or characteristic is illustrated at point A in FIG. 1 and lies substantially on the black body emissivity curve BB and has a color temperature in the order of about 2800° to 3600° K., or even more preferably between about 3200° to 3400° K. The dashed-dot line IA generally or substantially follows curve BB from A towards X. White light of these color temperatures, which can be generally described as a yellowish white, is contrasted to the 8000° K. or greater cold white represented by point C and by a cool white as represented by point D which has a color temperature in the order of about 5800° K. Thus the line IA represents the locus of points or colors actually present in a binary color display system exemplary of this invention and provides the advantageous perceived range of hues and saturations as illustrated by curve IP in FIG. 2. It will be noted that a line projected from point W, which represents theoretical white light (only achieved by mixing at least two sources of light and not obtainable from a single natural source), through point C toward curve S will intersect that saturation curve at a point between G and B and thus is indicative of the substantial amount of short wavelength or blue light present in the white light of such binary systems.

Figure 3:
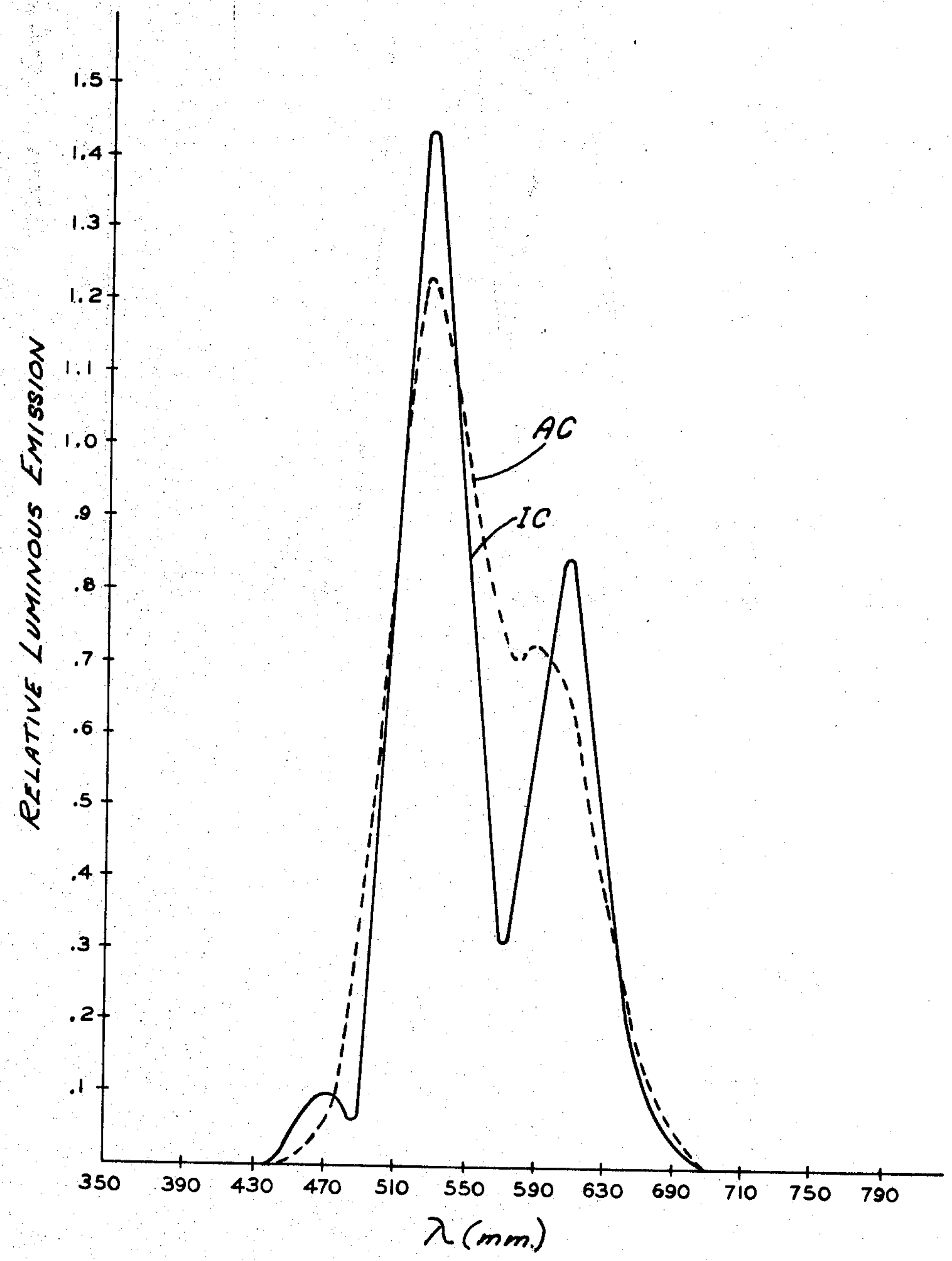
FIG. 3 is a relative luminous emission curve of a phosphor material having spectral emission characteristics used in the practice of this invention.

In an exemplary practice of the present invention in which a binary type of color television display system is described, a mixture of phosphors is utilized to provide white light of 2800° to 3600° K. A computer was used to solve the problem of determining the particular luminosity ratio of red, green and blue light-emitting phosphors which will produce a luminosity curve which would substantially (in a least-squares sense) match at about 3200° K. that of a black body. This relative luminosity ratio was found to be $I_R$: $I_G$: $I_B \cong 0.4/0.56/0.04$. FIG. 3 illustrates the ideal or theoretical luminosity curve by a solid line IC. The close approximation to this curve is represented by the actual luminosity curve AC in dashed lines of the calculated mixture of three phosphors. In this example, the phosphors used were a red light-emitting phosphor, zinc sulfide (20 percent) cadmium sulfide (80 percent) (silver activated) (such as obtainable under the trade designation 01100 from Sylvania Electric Products, Inc.) a green light-emitting phosphor, zinc sulfide (48 ) percent cadmium sulfide (52 ) percent (silver activated) (such as obtainable under the trade designation 01220 from Sylvania Electric Products, Inc.), and a blue light-emitting phosphor, cadmium sulfide (silver activated) (such as obtainable under the trade designation 01320 from Sylvania Electric Products, Inc.). These phosphors were mixed in a ratio which would provide the above relative luminosity ratio, an example being 0.9 gram of the red light-emitting phosphor, 1.0 gram of the green light-emitting phosphor and 0.6 gram of the blue light-emitting phosphor. In order to provide the desired higher electron energization thresholds for the green and blue light-emitting phosphors, these latter two types of phosphors were treated (e.g., as described in copending applications Ser. No. 459,582 now U.S. Pat. No. 3,408,223, filed May 28, 1965, and Ser. No. 561,815, now U.S. Pat. No. 3,449,148, filed June 30, 1966,) to have barrier layers which would increase the electron energization level required to cause them to emit substantial amounts of green and blue light over that electron energization threshold which must be exceeded for the red light-emitting phosphors to produce red light. For example, the red phosphor material is energizable to emit substantial amounts of red light by kinescope accelerating voltages in the order of about 6—7 kv., while an electron energization level equivalent to about 13 kv. is required in this example to cause the blue and green phosphor material to emit substantial amounts of blue and green light. At the higher electron energization level the red light-emitting phosphor continues to emit red light and thus the record or color signal carried by the electron beam at this higher voltage produces an image portion in white light of approximated approximately 2800° to 3600° K. At the lower accelerating voltage or electron energization, modulation of the current of the electron beam in accordance with another color signal or record produces an alternate image portion in light of relatively long wavelength, e.g., red. In such an exemplary system of the NTSC type, the red color signal from the color television receiver will be used for the record to produce image portions at the lower voltage level, while a color signal representing a color bee between the blue and the green NTSC signals (i.e., cyan) is used to modulate the electron beam at the higher voltage level and thus produce a second or alternate image portion in white light of the desired 2800° to 3600° K. range.

Figure 4:
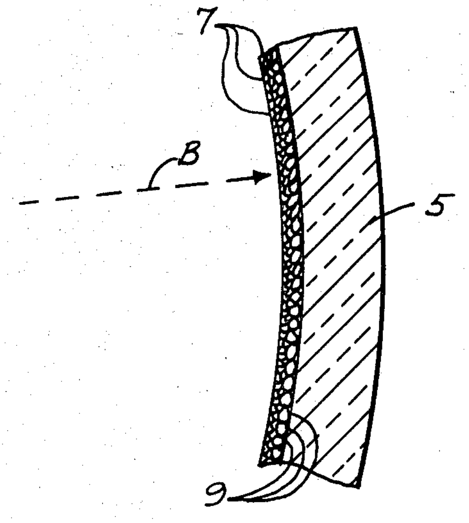
FIG. 4 illustrates an enlarged portion of a viewing screen of a color display system of this invention.

A viewing screen of a color display system of this invention is represented in FIG. 4 with a transparent glass face plate indicated at 5. The red light-emitting phosphor material is indicated by the smaller particles 7 while the second phosphor material made up substantially of phosphor particles which will emit blue and green light a at higher electron energization levels is indicated at 9. An electron beam B which is alternately energized at the lower and higher electron energization levels is used to excite the viewing screen phosphor materials following a raster scanning pattern. The light emitted from the viewing screen as illustrated in FIG. 4 will thus be either of a long wavelength or red in accordance with the first record at the lower voltage level, or of a white light of the described spectral composition (as indicated in FIG. 3) at the higher voltage level in accordance with the other record.

Figure 5:
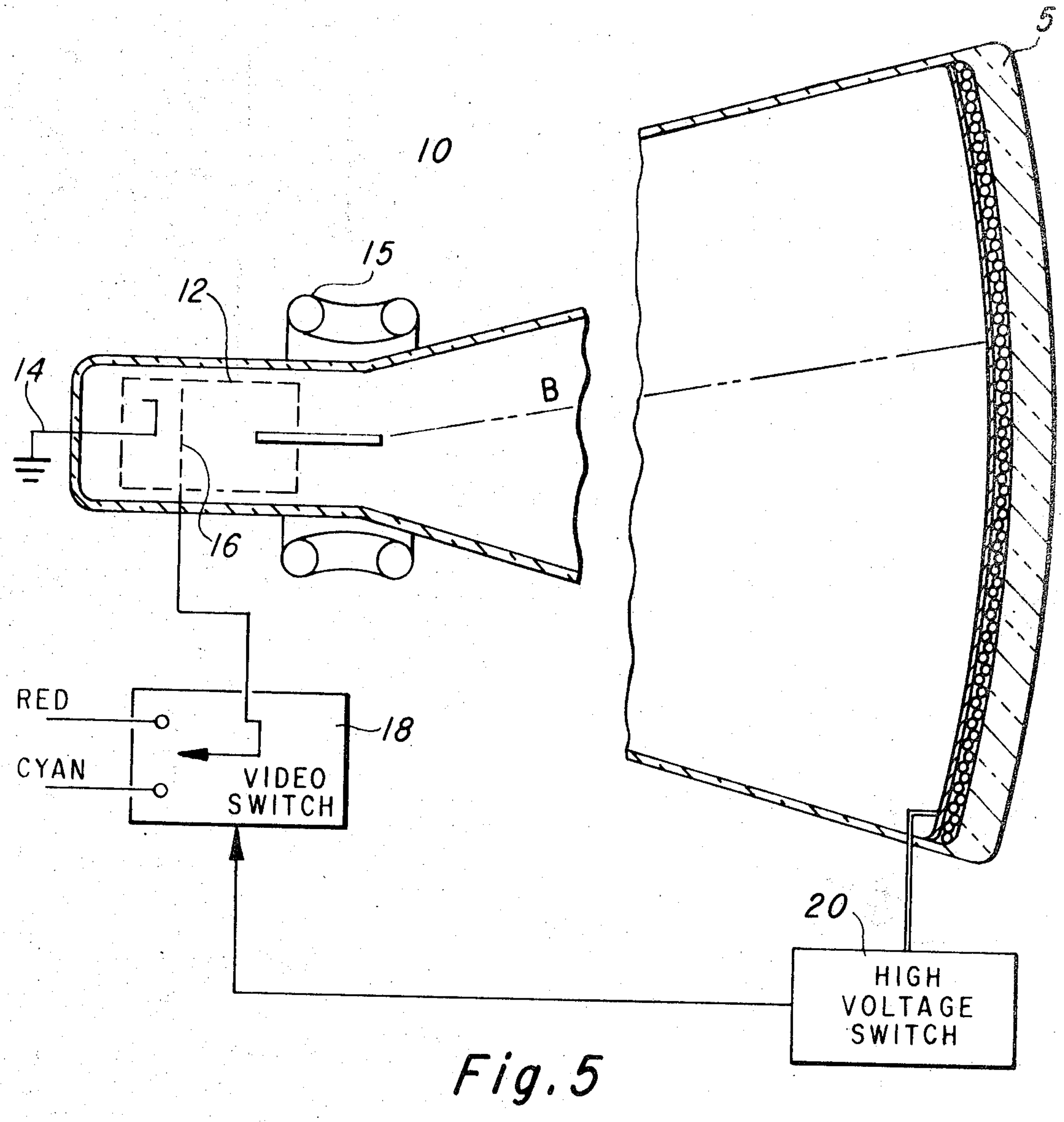
FIG. 5 schematically illustrates the color display system of the present invention.

Referring to FIG. 5, the display tube of a color display system is indicated generally at 10. The viewing screen of this tube is constructed as described herein with reference to FIG. 4. The tube 10 includes a conventional electron gun 12 for generating the stream B of w electrons, which is moved in a raster scanning pattern across screen 5 by conventional diffection yokes 15. The gun 12 includes a cathode 14 and a grid 16 for modulating the beam current or number of electrons in the stream B. By means of a video switch 18, the beam current is modulated alternately during sequential time intervals by electronic signals which represent the red and cyan color records respectively. Any on conventional video switching circuit may be used such as, for example, the circuit described in U.S. Pat. No. 3,459,833, issued to R. E. Smith, Aug. 5, 1969. A high voltage switch 20 is provided to synchronously switch the high voltage supply (not shown) so that while the beam current of B is being modulated in accordance with the red signal, a first accelerating voltage (for example, 6 kv) is applied between the viewing screen 5 and the cathode 14; and while the beam current is being modulated in accordance with the cyan signal, the accelerating voltage is increased to a higher level (for example, 13 kv). Any conventional high voltage switching circuit may be used, in such circuit being described in U.S. Pat. No. 3,492,416, issued to R. L. Weber, Jan. 27, 1970.

It should be noted that phosphors other than those exemplarily noted above may be used in color display systems of the present invention. For example, europium-activated yttrium vanadate may be advantageously used as the red light-emitting phosphor in place of the silver-activated zinc sulfide-cadmium sulfide noted above.

It will be understood that in illustrating the display system viewing screen in FIG. 4 any aluminized layers accelerating grids or mesh, or other interposed layers frequently used in viewing screen have been omitted, these being well-known to those skilled in this art.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A color display system for producing color images from two records, a said system comprising:
- a viewing screen including a first phosphor material which when energized emits light of relatively lone wavelengths, a second phosphor material which when energized emits light of wavelengths generally shorter than that emitted by said first phosphor;
- means for energizing said first phosphor material in response to a first record thereby to produce a corresponding image in light of said relatively long wavelengths; and
- means for independently simultaneously energizing both said first and second phosphor materials in response to a second record thereby to produce a corresponding image in achromatic light having a color temperature between about 2800° and 3600° K.

2. A color display system as set forth in claim 1 in which said first phosphor material emits red light and the second phosphor material is a mixture of green and blue light-emitting phosphors, the relative luminosity ratios of the red to the green to the blue phosphors being approximately 0.4:0.56:0.04.

3. A color display system as set forth in claim 1 in which the second phosphor material has an electron energization threshold substantially higher than that of said first phosphor material.